(12) United States Patent  
Takahashi (10) Patent No.: US 8,347,007 B2  
(45) Date of Patent: Jan. 1, 2013

(54) FIELD DEVICE AND FIELDBUS CONTROLLER

(75) Inventor: Seiichiro Takahashi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 263 days.

(21) Appl. No.: 12/200,241

(22) Filed: Aug. 28, 2008

(65) Prior Publication Data

US 2009/0062929 A1    Mar. 5, 2009

(30) Foreign Application Priority Data

Aug. 30, 2007    (JP) .................................. 2007-224331

(51) Int. Cl.
G06F 13/42    (2006.01)

(52) U.S. Cl. ...................................................... 710/105

(58) Field of Classification Search .................... 710/105
See application file for complete search history.

(56) References Cited

U.S. PATENT DOCUMENTS

| | | | |
|---|---|---|---|
| 5,197,068 A * | 3/1993 | Holien et al. | 370/527 |
| 5,700,090 A * | 12/1997 | Eryurek | 374/210 |
| 2003/0056043 A1 * | 3/2003 | Kostadinov | 710/104 |

FOREIGN PATENT DOCUMENTS

| | | |
|---|---|---|
| JP | H7-095260 | 4/1995 |
| JP | 2004-120668 A | 4/2004 |
| JP | 2007-34398 | 2/2007 |
| WO | 03023634 A1 | 3/2003 |
| WO | 03039098 A2 | 5/2003 |

OTHER PUBLICATIONS

European Search Report dated Jan. 13, 2009.
"YTZ 420 Application Manual: Fieldbus Communication Controller LSI," Catalog No. LSI-6TZ420A0, Jul. 1995, Yamaha Corporation.
European Office Action corresponding to European Application No. 08 014 778.8, dated Dec. 16, 2010.
Office Action dated Jun. 26, 2012 in Japanese Priority Application No. 2007-224331.

* cited by examiner

*Primary Examiner* — Paul R Myers
*Assistant Examiner* — Jeremy S Cerullo
(74) *Attorney, Agent, or Firm* — Sughrue Mion, PLLC (57) ABSTRACT

Disclosed is a field device that transmits and receives data via a fieldbus in accordance with any of a plurality of communication protocols. The field device includes: a control section to give an instruction on a communication protocol to be used for transmitting or receiving data via the fieldbus; and a fieldbus controller including a transmitting and receiving section to transmit and receive data in accordance with any of the plurality of communication protocols, and a switching section to switch between the communication protocols to be used by the transmitting and receiving section based on the instruction from the control section.

9 Claims, 12 Drawing Sheets

FIELD DEVICE AND FIELDBUS CONTROLLER

BACKGROUND OF THE INVENTION

1. Field of the Invention

The present invention relates to a field device and a fieldbus controller.

2. Description of Related Art

Conventionally, data communication between a control device and a field device such as a measuring instrument and a control valve is performed through a fieldbus in an industrial plant such as a petroleum plant, a petrochemical plant, a chemical plant, and a steel plant. The fieldbus is a digital bidirectional multi-drop communication link between a field device and a control device, and constitutes a local area network in the above described industrial plant.

Figure 8:
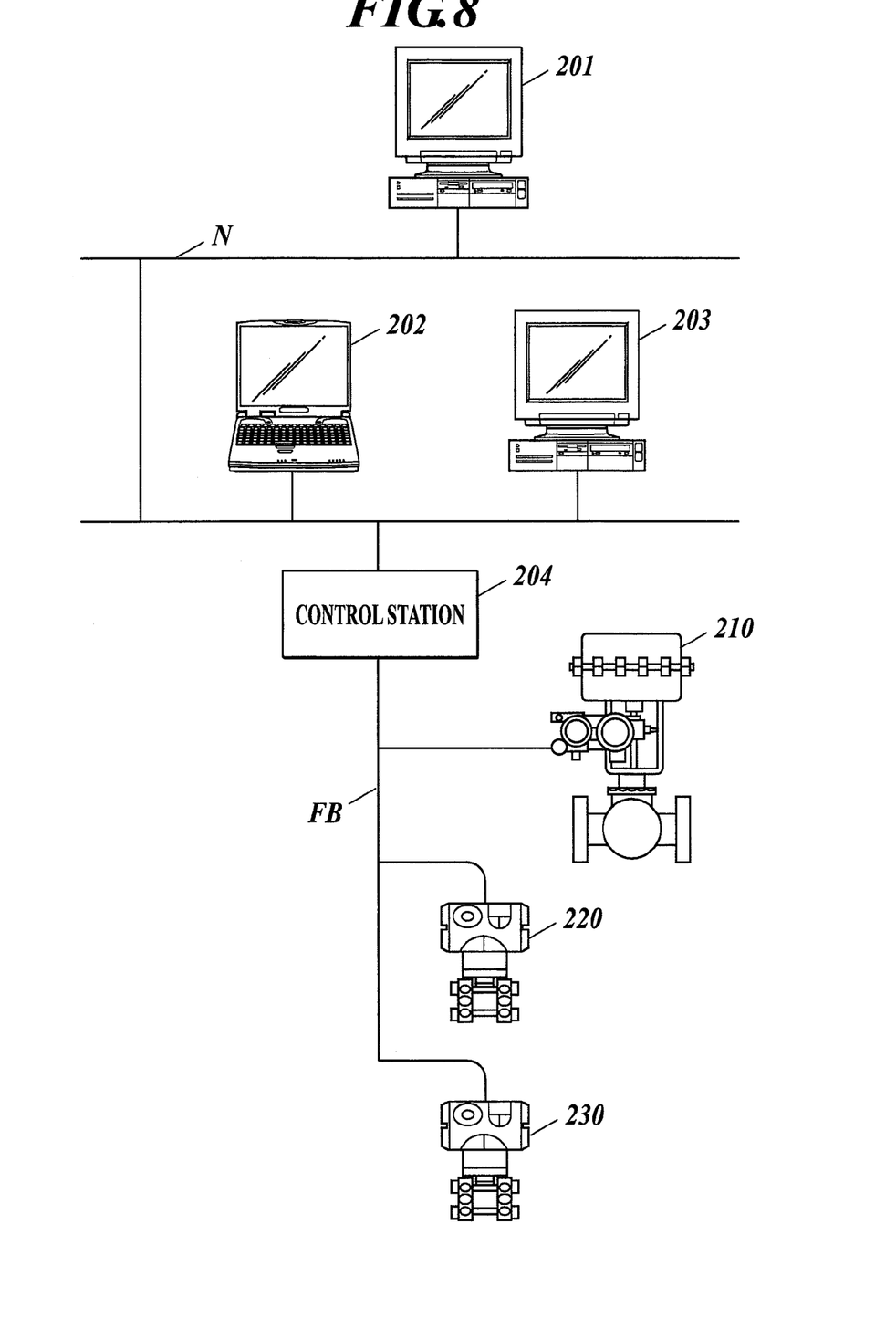
FIG. 8 shows a schematic diagram of an exemplary communication network connected through a fieldbus.

As shown in FIG. 8, a fieldbus FB connects a control station 204 to field devices 210, 220, and 230 such as control valves and measuring instruments provided at a field site. The control station 204 is connected to information devices 201 to 203 such as work stations (WS) via a communication network N. The information devices 201 to 203 are provided in the central control room, or the like in an industrial plant. Control of valves provided at a field site and a data collection from measuring instruments can be achieved by operating the information devices 201 to 203.

Figure 9:
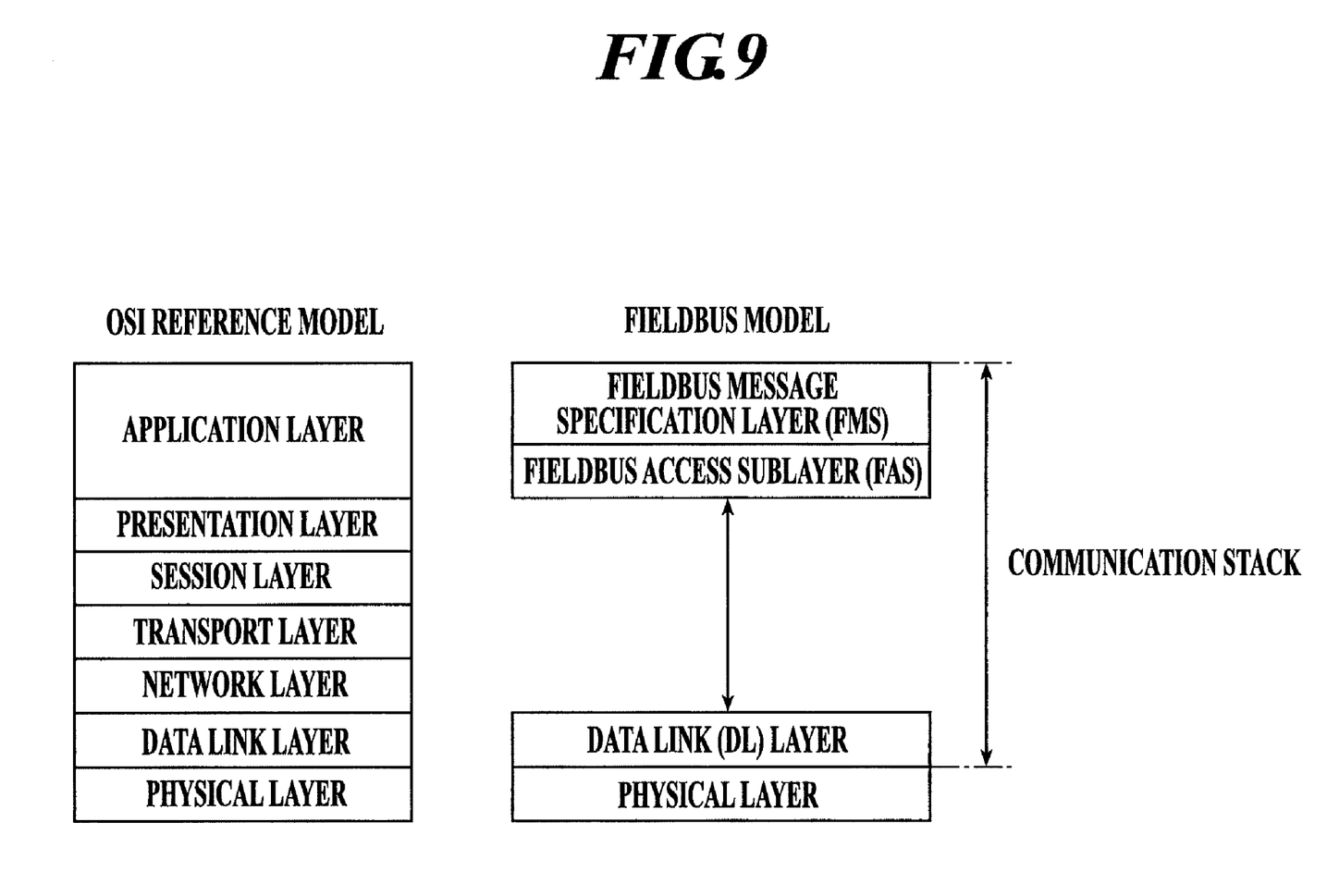
FIG. 9 shows a schematic diagram of exemplary communication specifications of a fieldbus.

Communication specifications of the above described fieldbus FB include three layers: a physical layer; a data link (DL) layer; and an application layer. This is simpler than the Open Systems Interconnection (OSI) reference model shown in FIG. 9. The second to seventh layers of the OSI reference model (the data link layer and the application layer of the fieldbus model) are occupied by software, and are generally called a communication stack.

The application layer of the fieldbus includes two sublayers: a fieldbus access sublayer (FAS); and a fieldbus message specification layer (FMS). The FAS connects the FMS to the data link layer. The FMS contains user data about measured variables from sensors, such as a positioner control signal, a lower limit signal, a valve opening signal, and an upper limit signal. The user data is used in the user application of a control device or a field device.

Figure 10:
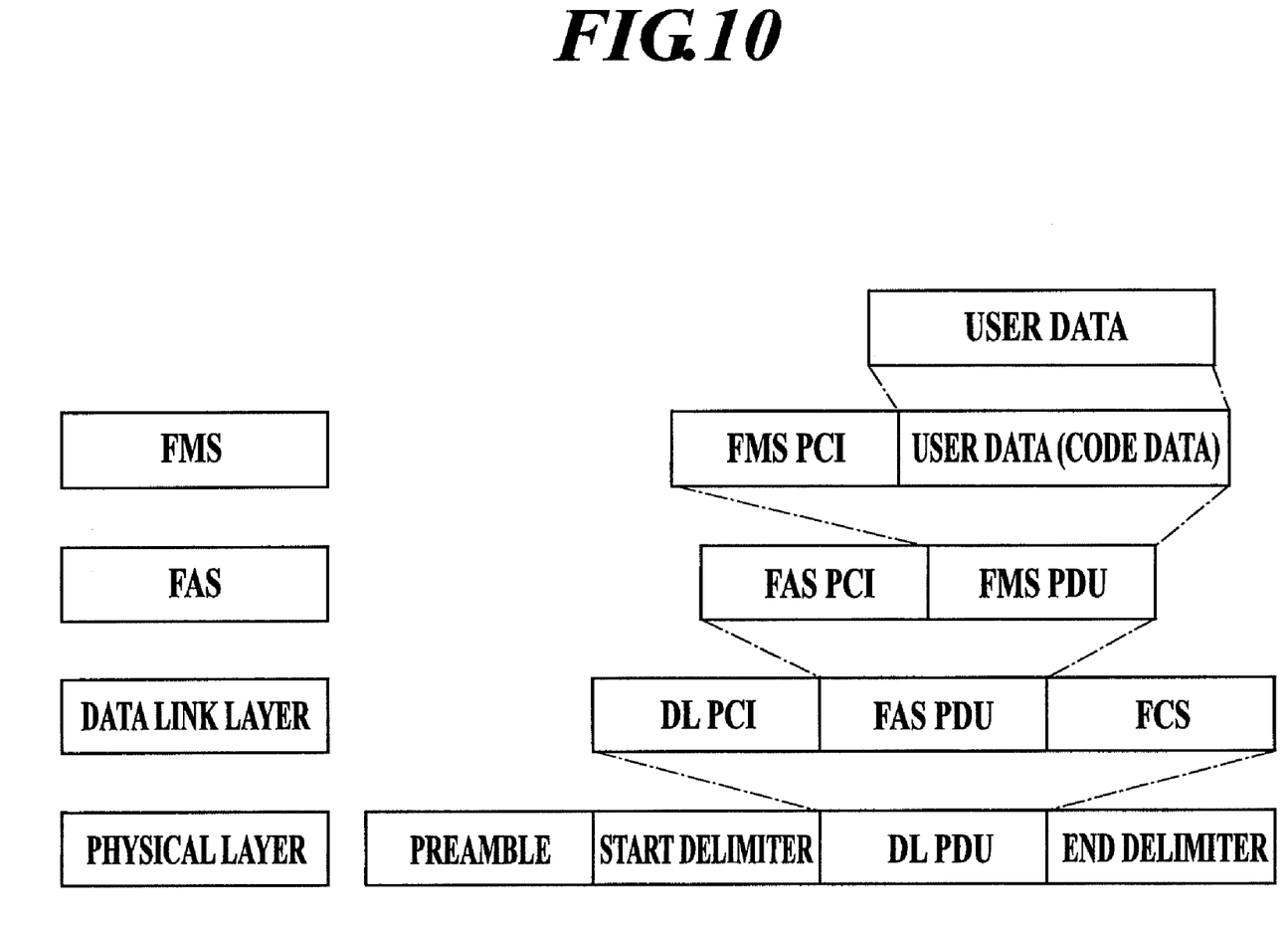
FIG. 10 shows a schematic diagram of data to be transmitted through a fieldbus.

Data transmission through the fieldbus will now be described. As shown in FIG. 10, at each layer, layer control information called protocol control information (PCI) and frame check sequence (FCS) using a cyclic redundancy check (CRC) method are added to a protocol data unit (PDU) as an upper layer. The PCI is control information on the PDU, and contains a flag sequence indicating start of the frame and/or end of the frame, an address field indicating transmission destination address, a control field, and the like.

As described above, since the information such as the PCI and FCS is added at each layer, the user data contains more information at a lower layer. At the physical layer that is the lowermost layer and performs data transmission on the fieldbus, data transmission is performed with a preamble, a start delimiter, and an end delimiter being added to the protocol data unit of the data link layer (DL PDU).

Figure 11:
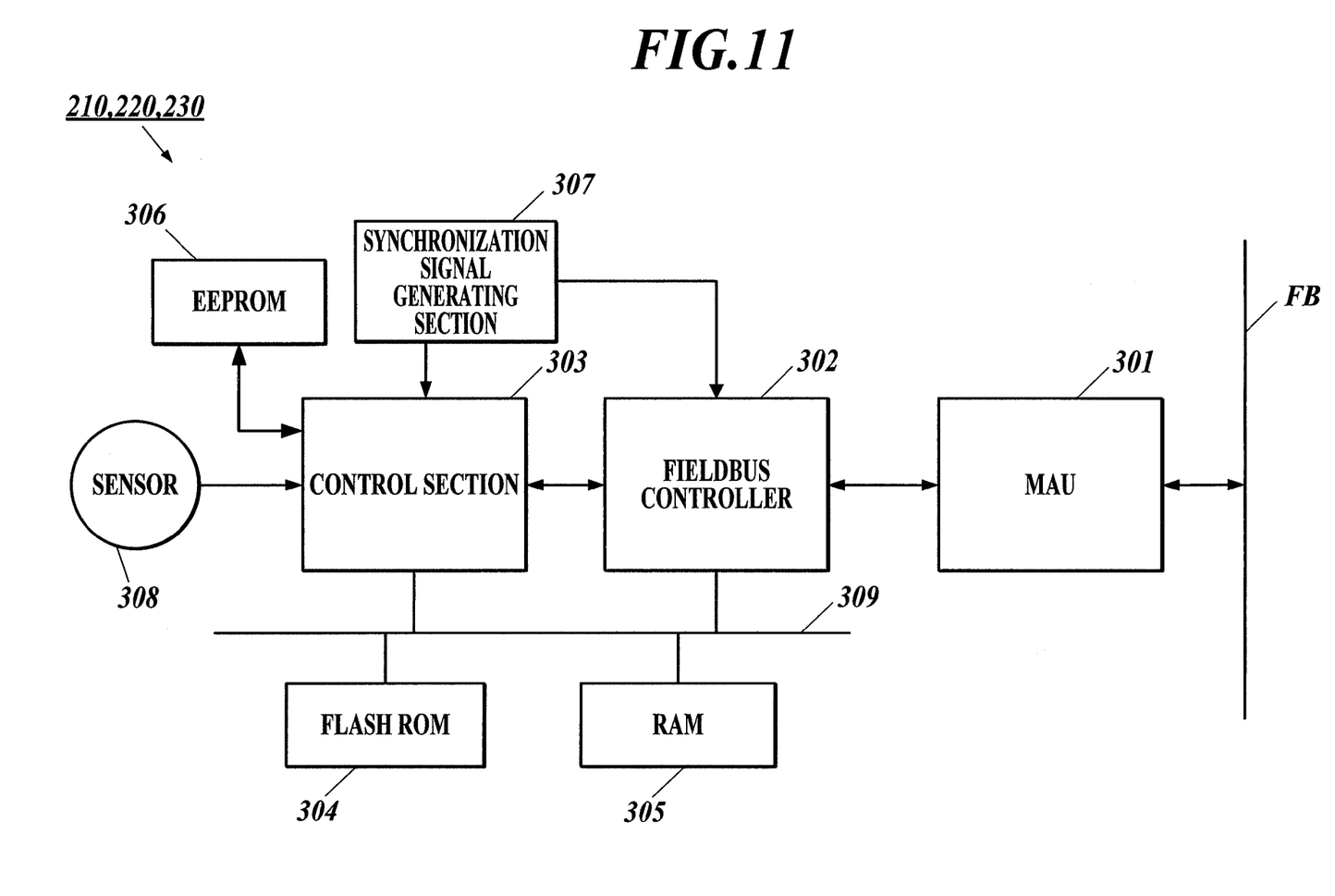
FIG. 11 is a block diagram schematically showing a configuration of a conventional field device.

Next, a conventional field device connected to the fieldbus FB will be described in detail. As shown in FIG. 11, the field device includes a MAU (media attachment unit) 301, a fieldbus controller 302, a control section 303, a flash ROM 304, a RAM (random access memory) 305, an EEPROM (electrically erasable and programmable read only memory) 306, a synchronization signal generating section 307, and a sensor 308. The control section 303, the fieldbus controller 302, the flash ROM 304, and the RAM 305 are connected to one another through an address bus 309.

The MAU 301 is connected to the fieldbus FB, and shapes a signal waveform when a signal transmission or reception through the fieldbus FB is performed.

Figure 12:
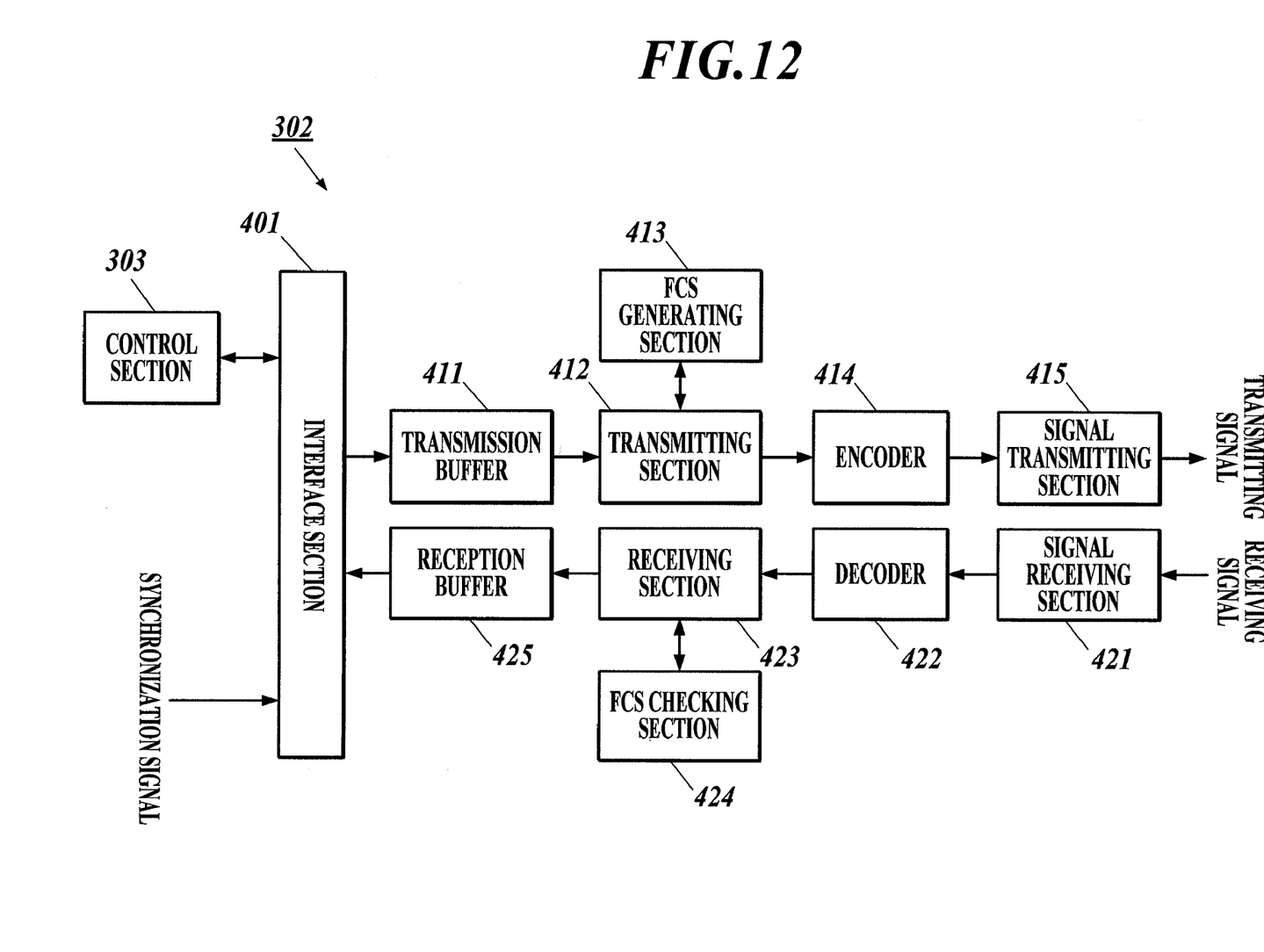
FIG. 12 is a block diagram schematically showing a configuration of a conventional fieldbus controller.

As shown in FIG. 12, the fieldbus controller 302 includes an interface section 401, a transmission buffer 411, a transmitting section 412, a FCS generating section 413, an encoder 414, a signal transmitting section 415, a signal receiving section 421, a decoder 422, a receiving section 423, a FCS checking section 424, and a reception buffer 425.

The interface section 401 is connected to the control section 303, and receives a synchronization signal from the synchronization signal generating section 307. The transmission buffer 411 is a buffer that stores data on a FIFO (First In, First Out) basis. The transmission buffer 411 sequentially stores transmission data which is inputted from the control section 303 via the interface section 401. The transmission data stored in the transmission buffer 411 is the protocol data unit of the FAS layer (FAS PDU) shown in FIG. 10.

The transmitting section 412 reads the transmission data stored in the transmission buffer 411, and adds the PCI of the data link layer and the FCS generated in accordance with the CRC method by the FCS generating section 413 to the transmission data. The transmitting section 412 then outputs the transmission data to the encoder 414. The encoder 414 encodes the data outputted from the transmitting section 412 using an encoding method such as Manchester encoding. The signal transmitting section 415 adds a preamble, a start delimiter, an end delimiter, and the like to the data (DL PDU) encoded by the encoder 414, and then outputs the data as a transmission signal to the MAU 301.

In the fieldbus controller 302, the transmission data (FAS PDU) from the control section 303 is temporarily stored in the transmission buffer 411, and a transmission signal (a preamble, a start delimiter, DL PDU, and an end delimiter) based on the transmission data is outputted to the MAU 301 in accordance with an interrupt signal from the control section 303, by means of the transmission buffer 411, the transmitting section 412, the FCS generating section 413, the encoder 414, and the signal transmitting section 415.

Upon receipt of a reception signal received by the MAU 301, the signal receiving section 421 outputs the data (DL PDU) except for the preamble, the start delimiter, and the end delimiter, to the decoder 422. The decoder 422 decodes the data which is received by the signal receiving section 421 and which is coded using the Manchester encoding.

The receiving section 423 removes the PCI and FCS of the data link layer from the data decoded by the decoder 422, and outputs the remaining FAS PDU to the FCS checking section 424. The FCS checking section 424 compares the CRC in the FAS PDU with the FCS contained in the received data to check the validity of the data. The receiving section 423 stores the FAS PDU after the FCS checking by the FCS checking section 424, into the reception buffer 425 as received data, and then outputs an interrupt signal to the control section 303.

In the fieldbus controller 302, the received data (FAS PDU) based on a reception signal (the preamble, the start delimiter, DL PDU, and the end delimiter) from the MAU 301 is temporarily stored in the reception buffer 425, and the interrupt signal is outputted to the control section 303, by means of the signal receiving section 421, the decoder 422, the receiving section 423, the FCS checking section 424, and the reception buffer 425.

As shown in FIG. 11, the control section 303 controls each section of the field device by sequentially reading setting information and control programs stored in the EEPROM 306, and by executing the control programs, using the RAM 305 as a work area.

More specifically, the control section 303 obtains the received data (FAS PDU) stored in the reception buffer 425 of the fieldbus controller 302 as needed, in accordance with the interrupt signal from the fieldbus controller 302. The control section 303 then extracts user data by performing processing based on the PCI (FAS PCI, FMS PCI, etc.), and executes processing based on the user data. Examples of the processing based on the user data include the following processing. If the user data is a command to read a measurement data, the measurement data stored in the RAM 305 is read, and is transmitted to the transmission source of the user data. If the user data is a command to write data into the RAM 305, the data based on the user data is written into the RAM 305.

Moreover, the control section 303 encodes user data to be transmitted to an external device, and adds the layer control information (FMS PCI, FAS PCI) to the encoded user data to create transmission data (FAS PDU). The control section 303 stores the transmission data into the transmission buffer 411 of the fieldbus controller 302, and outputs an interrupt signal for data transmission to the fieldbus controller 302.

The RAM 305 stores setting data of the field device and measurement data of the sensor 308. The synchronization signal generating section 307 is a circuit having a crystal oscillator. The synchronization signal generating section 307 generates a synchronization signal, and outputs the synchronization signal to the control section 303, the fieldbus controller 302, etc. The sensor 308 detects the measured variables, and outputs the measured variables to the control section 303.

As described above, in the conventional field device, the control section 303 performs the processing with respect to the upper layer corresponding to FAS PDU or higher layer, i.e., the application layer. Therefore, if a communication protocol other than a normal communication protocol, such as a communication protocol for safety instrumentation in which processing of the application layer is improved, is used, the firmware of the control section 303 is improved so as to cope with a plurality of communication protocols.

For example, a communication protocol for safety instrumentation is designed to perform additional processing to the normal communication protocol, to calculate a CRC 32 code based on the data of the application layer, and to doubly transmit and receive the data of the application layer including the CRC 32 code.

As a technique for a plurality of communication protocols, Japanese Patent Application Laid-Open No. 2004-120668 discloses a technique for performing transmission and reception by determining a frame of transmission data by the fieldbus controller 302, and selecting an appropriate communication protocol. YAMAHA Corporation, "YTZ 420 Application Manual", Catalog No.: LSI-6TZ420A0, July, 1995 discloses a conventional fieldbus controller.

In the above described conventional technique, however, some period of time is required to develop new firmware for the control section 303 to cope with a plurality of communication protocols, which cannot be readily achieved. If there is additional processing other than the normal communication protocol, the limited resource of the control section 303 is used to perform the additional processing. As a result, there are possibilities that the communication performance is degraded, and a longer time is required to perform the arithmetic processing to be originally performed, to convert a signal from the sensor, and to execute a function block.

SUMMARY OF THE INVENTION

It is, therefore, a main object of the present invention to provide a technique for readily performing data communication through a fieldbus using a plurality of communication protocols with less impact on original arithmetic processing performed by an apparatus.

According to a first aspect of the present invention, there is provided a field device that transmits and receives data via a fieldbus in accordance with any of a plurality of communication protocols, the field device, including: a control section to give an instruction on a communication protocol to be used for transmitting or receiving data via the fieldbus; and a fieldbus controller including a transmitting and receiving section to transmit and receive data in accordance with any of the plurality of communication protocols, and a switching section to switch between the communication protocols to be used by the transmitting and receiving section based on the instruction from the control section.

According to a second aspect of the present invention, there is provided a fieldbus controller, including: a transmitting and receiving section to transmit and receive data in accordance with any of a plurality of communication protocols; and a switching section to switch between the communication protocols to be used by the transmitting and receiving section based on an incoming instruction for switching.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Preferred embodiments of the present invention will be described below with reference to the drawings. The scope of the invention is not limited to what is shown in the drawings and described in the specification.

Figure 1:
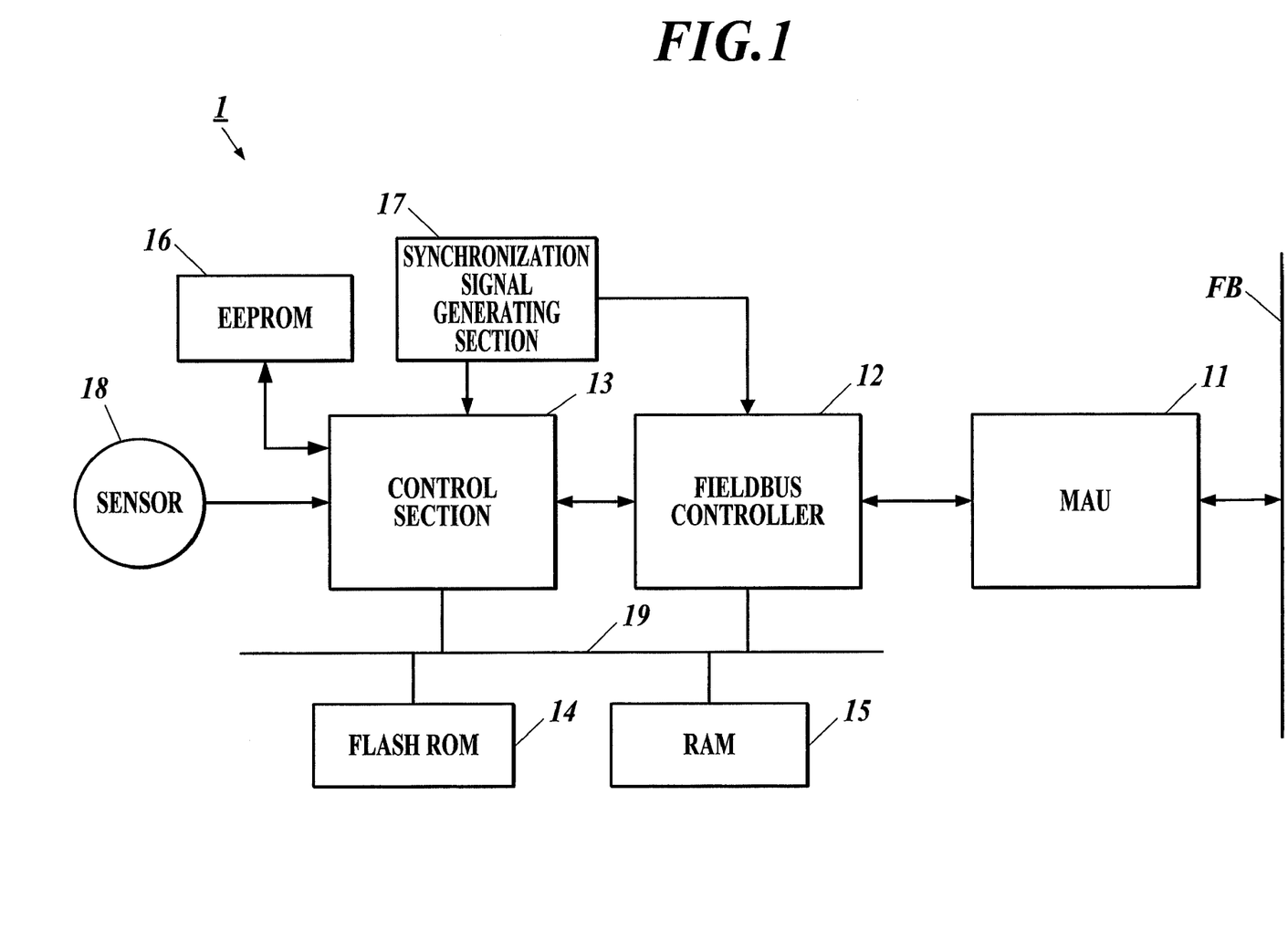
FIG. 1 is a block diagram schematically showing a configuration of a field device according to preferred embodiments of the present invention.

First, a configuration of a field device according to the preferred embodiments of the present invention will be described. As shown in FIG. 1, the field device 1 includes a MAU 11, a fieldbus controller 12, a control section 13, a flash ROM 14, a RAM 15, an EEPROM 16, a synchronization signal generating section 17, and a sensor 18. The field device 1 is connected to a fieldbus FB via the MAU 11. The fieldbus controller 12, the control section 13, the flash ROM 14, and the RAM 15 are connected to one another through an address bus 19 in the apparatus.

Since the MAU 11, the flash ROM 14, the RAM 15, the EEPROM 16, the synchronization signal generating section 17, and the sensor 18 are substantially the same as those of the conventional field device, explanation of these sections is omitted here.

Figure 2:
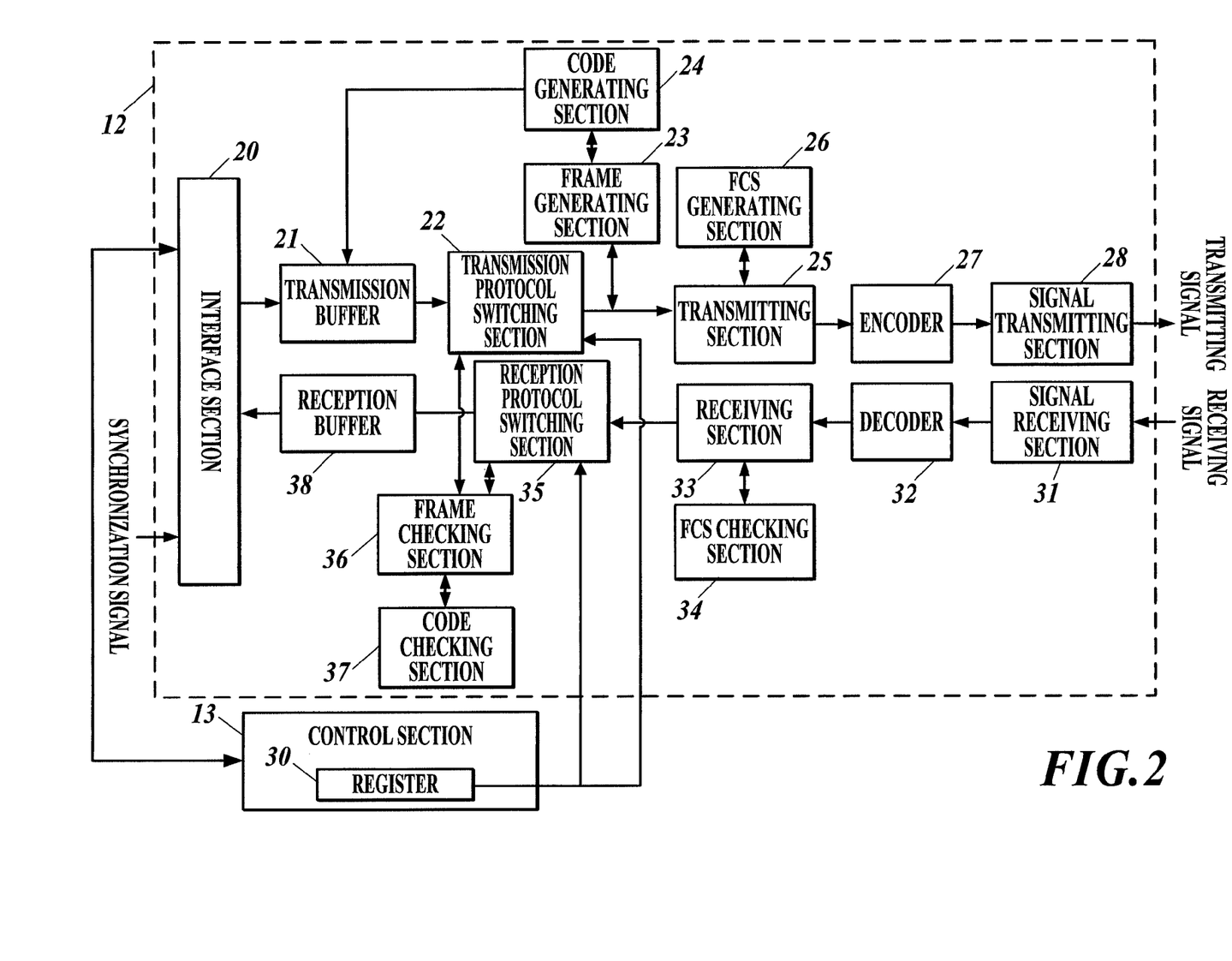
FIG. 2 is a block diagram schematically showing a configuration of a fieldbus controller according to preferred embodiments of the present invention.

As shown in FIG. 2, the fieldbus controller 12 includes an interface section 20, a transmission buffer 21, a transmission protocol switching section 22, a frame generating section 23, a code generating section 24, a transmitting section 25, a FCS generating section 26, an encoder 27, a signal transmitting section 28, a signal receiving section 31, a decoder 32, a receiving section 33, a FCS checking section 34, a reception protocol switching section 35, a frame checking section 36, a code checking section 37, and a reception buffer 38.

The control section 13 has a register 30 that stores information on the communication protocols to be used by the fieldbus controller 12. The information stored in the register 30 can be referred to by the transmission protocol switching section 22 and the reception protocol switching section 35.

Since the interface section 20, the transmission buffer 21, the transmitting section 25, the FCS generating section 26, the encoder 27, the signal transmitting section 28, the signal receiving section 31, the decoder 32, the receiving section 33, the FCS checking section 34, and the reception buffer 38 are substantially the same as those of the above described conventional fieldbus controller, explanation of these section is omitted here.

The transmission protocol switching section 22 refers to the information on the communication protocol to be used, which is stored in the register 30, and then switches between the communication protocols at the time of data transmission. The transmission protocol switching section 22 switches between the communication protocols at the time of data transmission, based on a check result of a received frame, which is checked by the frame checking section 36. The switching of the communication protocol at the time of transmission will be described later in detail in transmission protocol processing.

When the transmission protocol switching section 22 switches to a communication protocol for safety instrumentation, the frame generating section 23 reads transmission data stored in the transmission buffer 21, and generates a transmission frame corresponding to the communication protocol for safety instrumentation. For example, the frame generating section 23 generates a transmission frame by assigning the sequence number of the received data, on which a reply is based, to the transmission data (the reply to a read command) stored in the transmission buffer 21. The code generating section 24 generates code data which is calculated from the transmission data and the sequence number, which are contained in the transmission frame generated by the frame generating section 23, and from a connection key value, in accordance with a CRC 32 method.

The reception protocol switching section 35 refers to the information on the communication protocol to be used, which is stored in the register 30, and then switches between the communication protocols at the time of data reception. The reception protocol switching section 35 switches between the communication protocols at the time of reception, based on a check result of a received frame, which is checked by the frame checking section 36. The switching of the communication protocol at the time of reception will be described later in detail in reception protocol processing.

The frame checking section 36 reads a reception frame (received data in the FMS PDU), and determines whether a command in the reception frame is a read command or a write command. The code checking section 37 calculates code data from the received data and the sequence number which are contained in the reception frame, and from the connection key value, in according with the CRC 32 method. The code checking section 37 then checks on validity of the reception frame by comparing the code data with data equivalent to CRC 32 of the reception frame.

As described above, in the fieldbus controller 12, the transmission protocol switching section 22 and the reception protocol switching section 35 refer to the register 30 of the control section 13, and switch between the communication protocols based on the information stored in the register 30. The communication protocols to be switched include a normal communication protocol in a conventional format, and a communication protocol for safety instrumentation that is used in the frame generating section 23, the code generating section 24, the frame checking section 36, and the code checking section 37.

According to the communication protocol for safety instrumentation, a CRC 32 code is calculated based on data of an application layer, and the data of the application layer including the code calculated by the CRC 32 method is doubly transmitted.

In a communication specification of the communication protocol for safety instrumentation, the normal communication protocol is used for the reception frame when a read command is received, and the communication protocol for safety instrumentation is used for the reply. When a write command is received, the communication protocol for safety instrumentation is used for the reception frame, and the normal communication protocol is used for the reply.

In this embodiment, the fieldbus controller 12 performs data transmission by switching between the normal communication protocol and the communication protocol for safety instrumentation. However, the fieldbus controller 12 may perform data transmission by switching between three or more communication protocols. Also, types of communication protocols may not be limited to the normal and safety instrumentation types.

Next, an operation performed by the control section 13 and the fieldbus controller 12 in the field device 1 will be described with reference to FIGS. 3 to 5. In the following description, "A" is attached to the top of each reference numeral with respect to each step to be carried out by the fieldbus controller 12, "B" is attached to the top of each reference numeral with respect to each step to be carried out by the control section 13, and "C" is attached to the top of each reference numeral with respect to signal transmission and reception between the fieldbus controller 12 and the control section 13.

Figure 3:
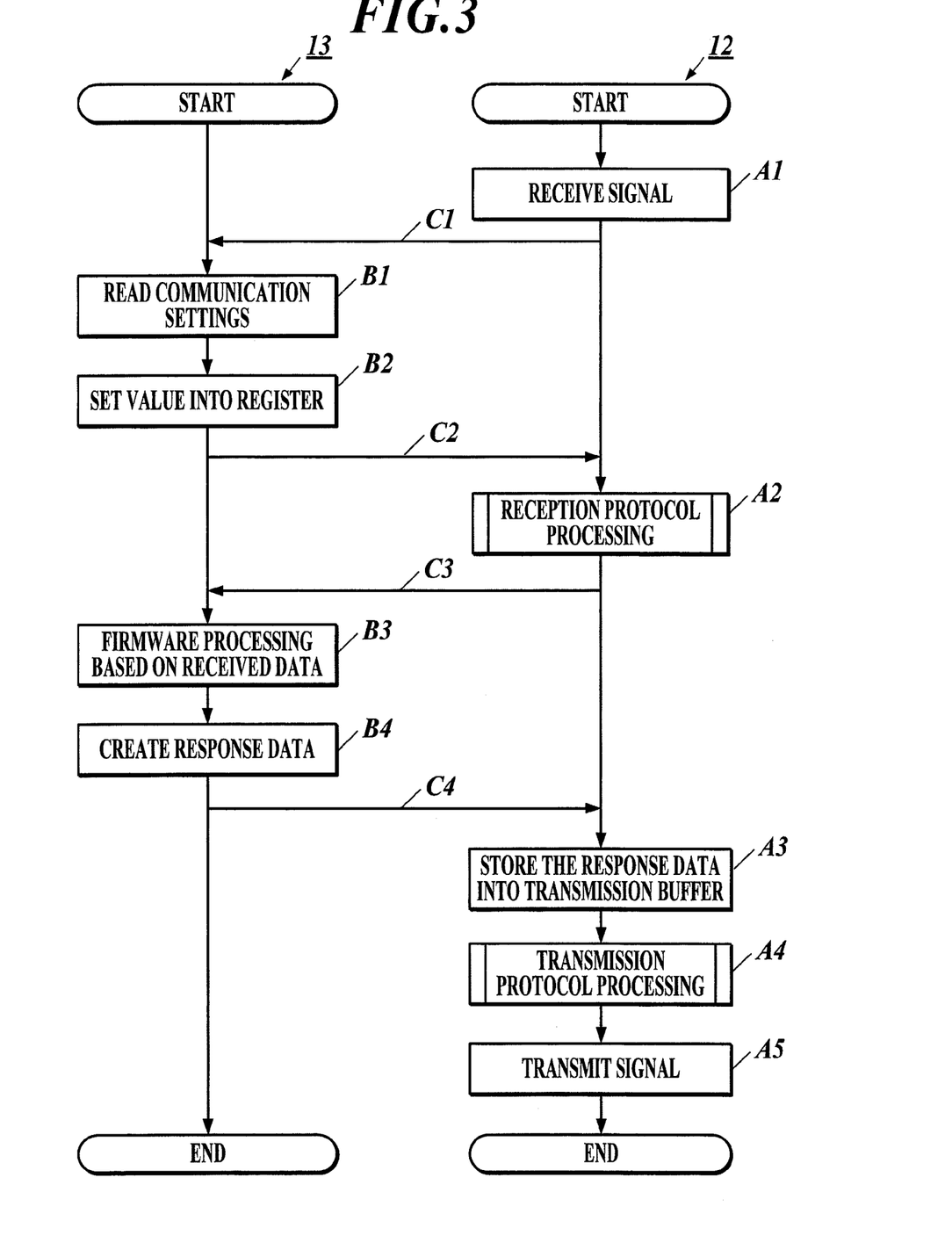
FIG. 3 is a ladder chart showing an operation of the field device.

As shown in FIG. 3, in the field device 1, the fieldbus controller 12 starts receiving a signal from the MAU 11, and stores the received data into the reception buffer 38 (step A1) Then, an interrupt signal is transmitted from the fieldbus controller 12 to the control section 13, and the control section 13 refers to the received data (step C1).

The control section 13 then reads setting data about the communication protocol of the field device 1 from the EEPROM 16 (step B1). Based on the setting data and the received data to which the control section 13 refers, a value representing a communication protocol to be used for the transmission and received data in the fieldbus controller 12, is set in the register 30 (step B2).

The fieldbus controller 12 refers to the value set in the register 30 in step B2 (step C2), and performs reception protocol processing (step A2).

Figure 4:
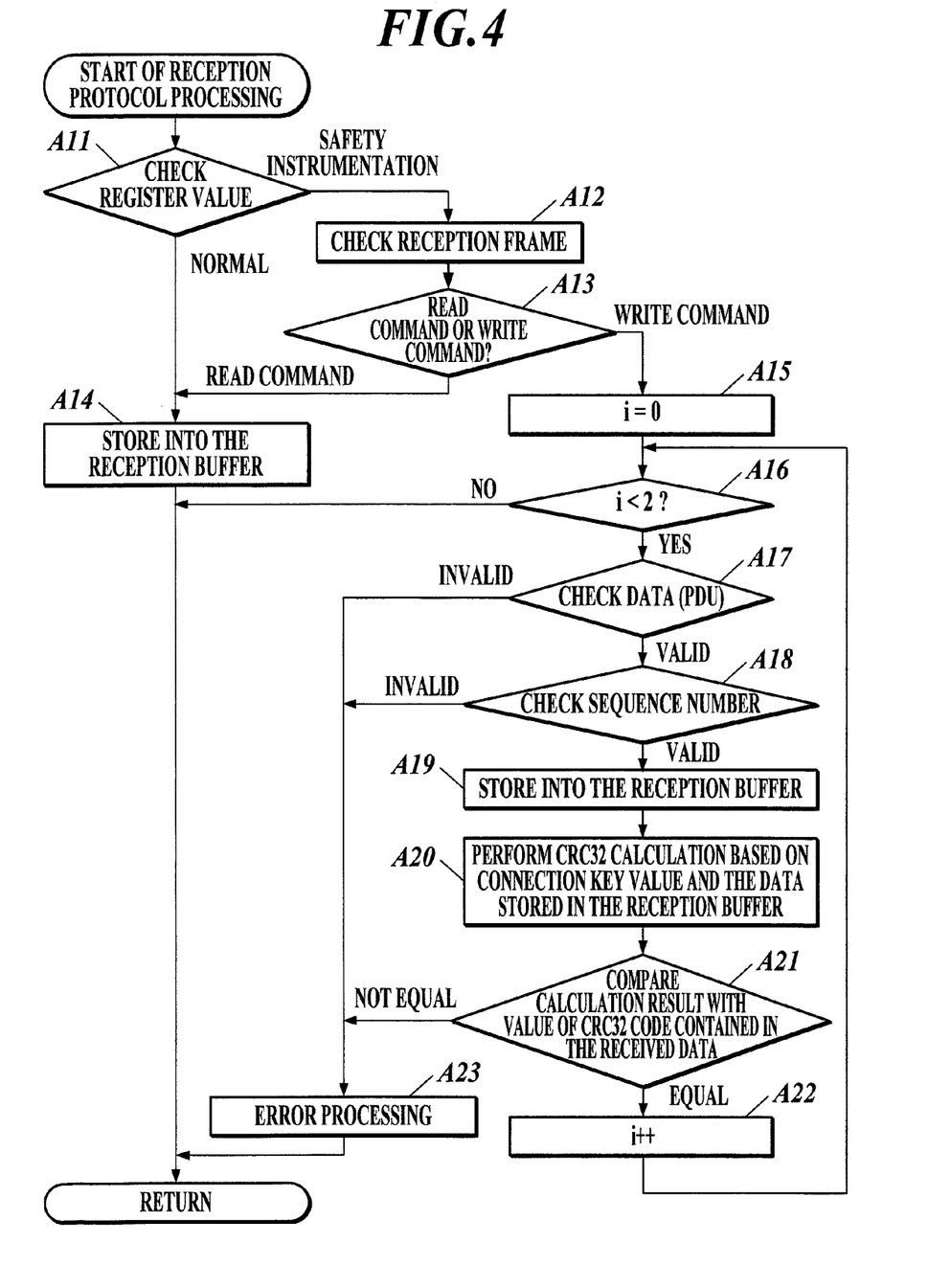
FIG. 4 is a flowchart showing reception protocol processing.

As shown in FIG. 4, when the reception protocol processing starts, the fieldbus controller 12 determines whether the value set in the register 30 is a value indicating the use of the normal communication protocol or a value indicating the use of the communication protocol for safety instrumentation (step A11).

The determination in step A11 may be carried out with respect to three or more communication protocols, instead of the above-described two communication protocols (the normal communication protocol and the communication protocol for safety instrumentation). Also, with respect to a communication protocol other than the above-described communication protocols, the determination in step A11 may be carried out.

If the use of the communication protocol for safety instrumentation is determined in step A11, the frame checking section 36 checks a reception frame (step A12), and determines whether a command in the reception frame is a read command or a write command (step A13).

If the communication protocol is determined to be the normal communication protocol in step A11, or a command in the reception frame is determined to be a read command in step A13, the data received from the receiving section 33 is stored in the reception buffer 38 as it is (step A14), without any processing for the data of the application layer to be doubly transmitted or for the communication protocol for safety instrumentation such as a CRC 32 check by the code checking section 37.

If a command in the reception frame is determined to be a write command in step A13, steps A15 to A23 are carried out to perform the reception processing with respect to the transmitted data in accordance with the communication protocol for safety instrumentation.

More specifically, doubly transmitted data are received by carrying out steps A17 to A22 when i is 0 and when i is 1, respectively. PDU of data is checked with respect to the respective pieces of the received data (step A17). Next, a sequence number is checked (step A18). More specifically, whether the sequence number of the received data is equal to a predetermined number is determined in step A18. The received data is then stored in the reception buffer 38 (step A19).

Next, a CRC 32 code calculation is performed based on the connection key value and the data stored in the reception buffer 38 (step A20). The calculation result is then compared with the value of the CRC 32 code contained in the received data, so as to check on validity of the reception data (step A21).

If a negative result (invalid) is obtained in step A17 or A18, or if the two code values are not equal and the validity of the received data is denied in step A21, error processing is performed by discarding the received data stored in the reception buffer 38 or sending a resend request to the transmission source, for example (step A23).

As shown in FIG. 3, after the above-described reception protocol processing (step A2), an interrupt signal is transmitted from the fieldbus controller 12 to the control section 13, and the control section 13 refers to the received data stored in the reception buffer 38 after the reception protocol processing (step C3).

In step C3, if the communication protocol is determined to be the normal communication protocol in step A11, or a command in the reception frame is determined to be a read command in step A13, any processing based on the communication protocol for safety instrumentation is not performed, and the received data that is stored in the reception buffer 38 by signal reception in the signal receiving section 31 is referred to by the control section 13 without change. On the other hand, if the communication protocol is determined to be the communication protocol for safety instrumentation in step A11, and a command in the reception frame is determined to be a write command in step A13, processing based on the communication protocol for safety instrumentation is performed with respect to the received data obtained by signal reception in the signal receiving section 31, and the control section 13 refers to the data stored in the reception buffer 38 in step C3.

Next, firmware processing is performed based on the received data (step B3), and response data is created (step B4). The response data is transmitted from the control section 13 to the fieldbus controller 12 (step C4).

The transmitted response data is then stored in the transmission buffer 21 (step A3), and transmission protocol processing is performed (step A4).

Figure 5:
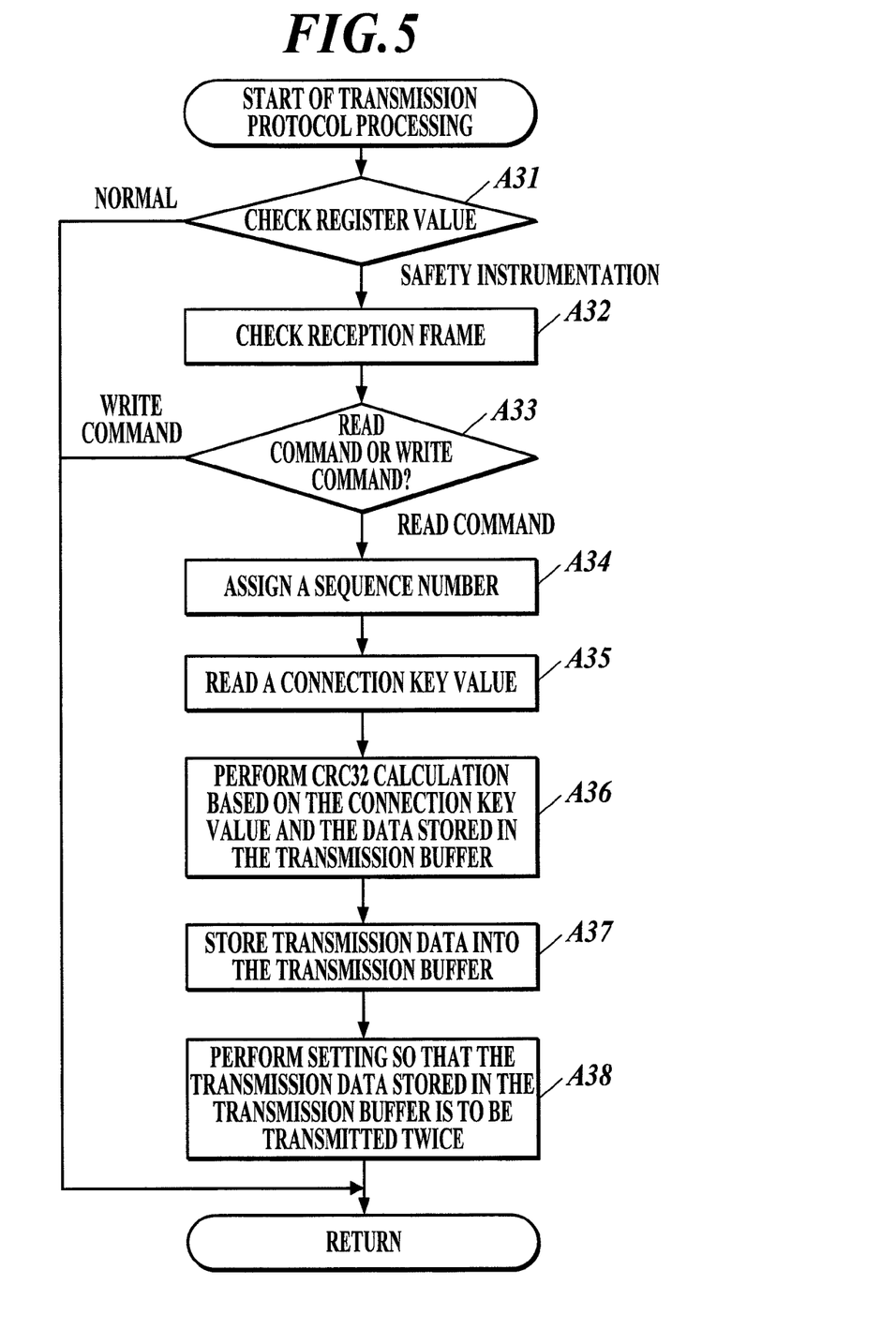
FIG. 5 is a flowchart showing transmission protocol processing.

As shown in FIG. 5, when the transmission protocol processing starts, the fieldbus controller 12 determines whether the value set in the register 30 is a value indicating the use of the normal communication protocol or a value indicating the use of the communication protocol for safety instrumentation (step A31).

The determination in step A31 may be carried out with respect to three or more communication protocols, instead of the above-described two communication protocols (the normal communication protocol and the communication protocol for safety instrumentation). Also, with respect to a communication protocol other than the above-described communication protocols, the determination in step A31 may be carried out.

If the use of the communication protocol for safety instrumentation is determined in step A31, the frame checking section 36 checks a reception frame of the received data as a basis of a reply (step A32), and determines whether a command in the reception frame is a read command or a write command (step A33).

If the communication protocol is determined to be the normal communication protocol in step A31, or a command in the reception frame is determined to be a write command in step A33, the transmission protocol processing comes to a return, without implementing any processing based on the communication protocol for safety instrumentation, such as processing for doubly transmitting data of the application layer and processing for generating a CRC 32 code and attaching the CRC 32 code to the transmission data by the code generating section 24.

If a command in the reception frame is determined to be a read command in step A33, steps A34 to A38 for transmission processing are carried out in accordance with the communication protocol for safety instrumentation, and then the transmission protocol processing comes to a return.

More specifically, a sequence number based on the received data as a basis of a reply is assigned (step A34), and a connection key value is read (step A35). Based on the connection key value and the data stored in the transmission buffer 21, a CRC 32 code calculation is performed (step A36).

The response data, the sequence number assigned in step A34, and the calculation result in step A36 is stored in the transmission buffer 21 in this order as transmission data which meets the requirement of the communication protocol for safety instrumentation (step A37). Setting is then performed so that the transmission data stored in the transmission buffer 21 is to be transmitted twice (step A38). Specifically, the same transmission data is stored in the transmission buffer 21 twice in a row.

As shown in FIG. 3, after the above-described transmission protocol processing (step A4), a signal based on the transmission data stored in the transmission buffer 21 is transmitted from the signal transmitting section 28 to the MAU 11 (step A5).

If the communication protocol is determined to be the normal communication protocol in step A31, or a command in the reception frame is determined to be a write command in step A33, the response data from the control section 13 is transmitted without change in accordance with the normal communication protocol in step A5. On the other hand, if the communication protocol is determined to be the communication protocol for safety instrumentation in step A31, and a command in the reception frame is determined to be a read command in step A33, the response data from the control section 13 is transmitted in accordance with the communication protocol for safety instrumentation in step A5.

As described above, the field device 1 transmits and receives data via a fieldbus in accordance with any of a plurality of communication protocols. The field device 1 includes a control section (the control section 13) to give an instruction on a communication protocol to be used for transmitting or receiving data via the fieldbus, and a fieldbus controller (the fieldbus controller 12). The fieldbus controller includes a transmitting and receiving section (the transmitting section 25 and the receiving section 33) to transmit and receive data in accordance with any of the plurality of communication protocols, and a switching section (the transmission protocol switching section 22 and the receiving protocol switching section 35) to switch between the communication protocols to be used by the transmitting and receiving section based on the instruction from the control section.

With this structure, when a data communication is performed through the fieldbus using a plurality of communication protocols, there is no need for the control section 13 to perform processing with respect to the communication protocols (such as steps A2 and A4). Accordingly, the data communication through the fieldbus using a plurality of communication protocols can be performed with less impact on original arithmetic processing performed by the field device 1. Also, since the control section 13 simply gives an instruction on a communication protocol, it is possible to cope with a plurality of communication protocols while minimizing a change of firmware in the control section 13. Thus, the development period for this firmware can be shortened, and the field device 1 can readily be realized.

The fieldbus controller of the field device 1 further includes a frame checking section (the frame checking section 36) to check contents of a reception frame of the data received by the transmitting and receiving section. The switching section switches between the communication protocols to be used by the transmitting and receiving section based on the contents of the reception frame checked by the frame checking section.

With this structure, protocol switching can be performed based on the contents of the reception frame. For example, the protocol switching can be performed based on whether a command in the reception frame is a read command or a write command.

The switching section of the field device 1 switches to each of a communication protocol for transmission data and a communication protocol for received data independently of the other, based on the instruction from the control section.

Accordingly, switching between a communication protocol for transmission and a communication protocol for reception can be performed. For example, the normal communication protocol can be used for reception, and the communication protocols for safety instrumentation can be used for transmission. Contrary to this, the communication protocol for safety instrumentation can be used for reception, and the normal communication protocol can be used for transmission. Therefore, the field device 1 can perform communication, regardless of whether the other field device is compatible with the communication protocol for safety instrumentation. Also, the fieldbus controller 12 of the field device 1 performs different communication protocol processing between transmission and reception, by checking the reception frame. Therefore, the firmware of the control section 13 can be designed to have less impact on the original arithmetic processing performed by the field device.

The control section of the field device 1 has a register (the register 30) to which the fieldbus controller can refer, and stores information on a communication protocol to be instructed, into the register.

With this structure, the communication protocols to be used for transmission and reception by the fieldbus controller can be set through the register, to which the fieldbus controller can refer. Accordingly, it is possible to minimize a change of firmware in the field device 1 to cope with a plurality of communication protocols. Thus, the development period for firmware can be shortened, and the development cost of firmware can be reduced. Further, the reliability of the firmware can be enhanced.

<First Modification>

Figure 6:
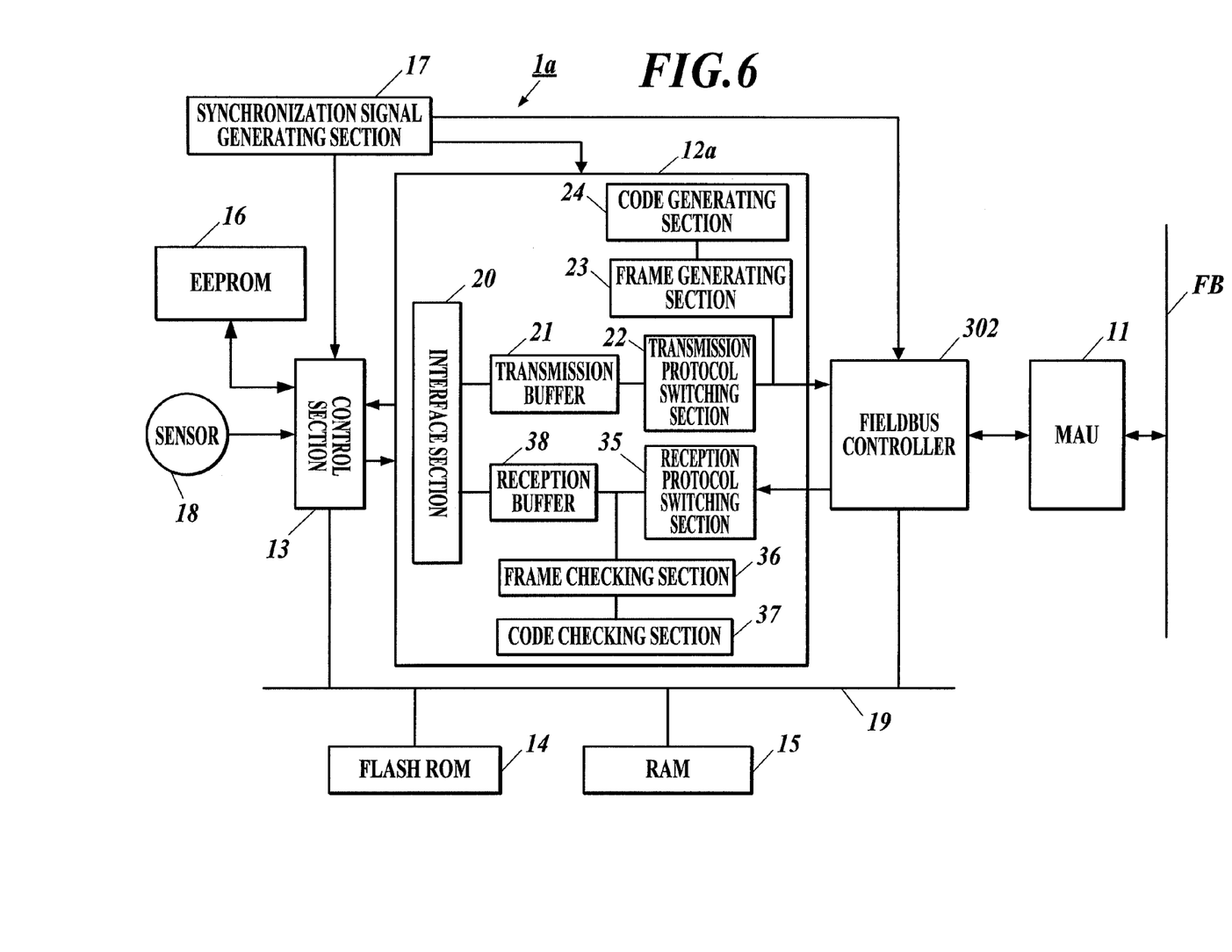
FIG. 6 is a block diagram schematically showing a configuration of a field device according to a first modification of the preferred embodiments.

As shown in FIG. 6, the above-described field device 1 may be modified into a field device 1a that includes a controller 12a compatible with safety instrumentation. The controller 12a is connected in series between the control section 13 and a conventional fieldbus controller 302. In this case, an interrupt signal is transmitted from the controller 12a to the control section 13.

The controller 12a of the field device 1a includes the interface section 20, the transmission buffer 21, the transmission protocol switching section 22, the frame generating section 23, the code generating section 24, the reception protocol switching section 35, the frame checking section 36, the code checking section 37, and the reception buffer 38. With this structure, the above-described steps A2 and A4 can be carried out.

<Second Modification>

Figure 7:
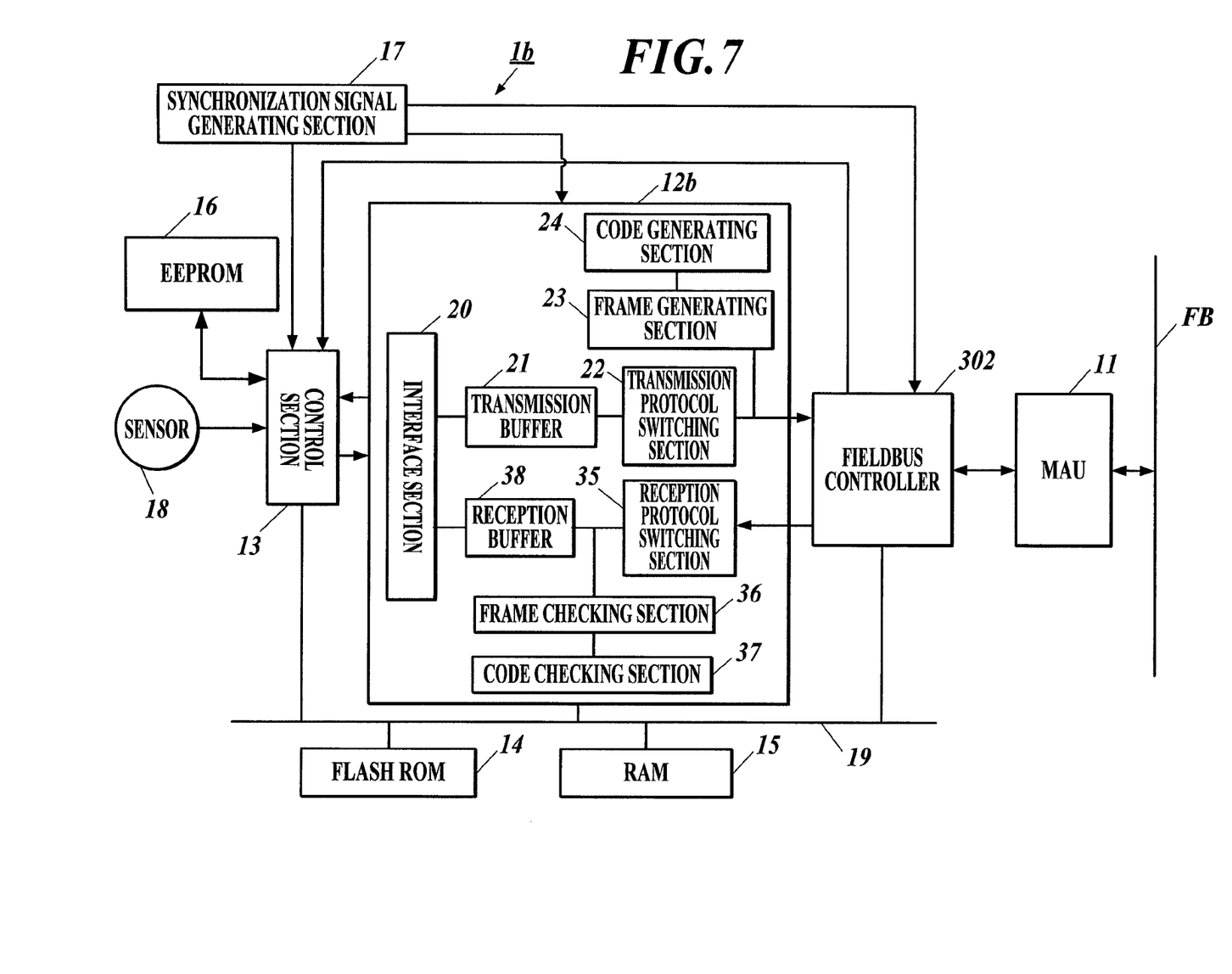
FIG. 7 is a block diagram schematically showing a configuration of a field device according to a second modification of the preferred embodiments.

As shown in FIG. 7, the field device 1 may also be modified into a field device 1b that includes a controller 12b compatible with safety instrumentation. The controller 12b is connected in parallel to the control section 13 and the conventional fieldbus controller 302. In this case, an interrupt signal is transmitted from the fieldbus controller 302 to the control section 13.

The controller 12b of the field device 1b includes the interface section 20, the transmission buffer 21, the transmission protocol switching section 22, the frame generating section 23, the code generating section 24, the reception protocol switching section 35, the frame checking section 36, the code checking section 37, and the reception buffer 38. With this structure, the above-described steps A2 and A4 can be carried out.

The foregoing detailed description is exemplary, and the present invention is not limited to the description. Various changes may be made to configurations and operations in the above-described embodiments.

According to one aspect of the preferred embodiments of the present invention, there is provided a field device that transmits and receives data via a fieldbus in accordance with any of a plurality of communication protocols, the field device, including: a control section to give an instruction on a communication protocol to be used for transmitting or receiving data via the fieldbus; and a fieldbus controller including a transmitting and receiving section to transmit and receive data in accordance with any of the plurality of communication protocols, and a switching section to switch between the communication protocols to be used by the transmitting and receiving section based on the instruction from the control section.

With this structure, there is no need for the control section to perform a number of procedures with respect to a plurality of communication protocols when a data communication is performed through the fieldbus using the plurality of communication protocols. Accordingly, it is possible to reduce the impact on original arithmetic processing performed by the field device. Moreover, since the control section simply gives an instruction on a communication protocol, it is possible to cope with a plurality of communication protocols while minimizing a change of firmware in the control section. Thus, the field device can readily be realized.

Preferably, the fieldbus controller further includes a frame checking section to check contents of a reception frame of the data received by the transmitting and receiving section, and the switching section switches between the communication protocols to be used by the transmitting and receiving section based on the contents of the reception frame checked by the frame checking section.

Preferably, the switching section switches to each of a communication protocol for transmission data and a communication protocol for received data independently of the other, based on the instruction from the control section.

Preferably, the control section has a register to which the fieldbus controller can refer, and stores information on a communication protocol to be instructed, into the register.

According to another aspect of the preferred embodiments of the present invention, there is provided a fieldbus controller, including: a transmitting and receiving section to transmit and receive data in accordance with any of a plurality of communication protocols; and a switching section to switch between the communication protocols to be used by the transmitting and receiving section based on an incoming instruction for switching.

Preferably, the fieldbus controller further includes a frame checking section to check contents of a reception frame of the data received by the transmitting and receiving section, wherein the switching section switches between the communication protocols to be used by the transmitting and receiving section based on the contents of the reception frame checked by the frame checking section.

Preferably, the switching section switches to each of a communication protocol for transmission data and a communication protocol for received data independently of the other, based on the incoming instruction for switching.

The entire disclosure of Japanese Patent Application No. 2007-224331 filed on Aug. 30, 2007 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A field device that transmits and receives data via a fieldbus in accordance with any of a plurality of communication protocols, the field device comprising:
   a control section to give an instruction on a communication protocol to be used for transmitting and/or receiving data via the fieldbus, the communication protocol being among the plurality of communication protocols; and
   a fieldbus controller to perform protocol processing, the fieldbus controller including:
   receiving section that receives data in accordance with any of the plurality of communication protocols;
   a transmitting section that transmits data in accordance with any of the plurality of communication protocols;
   a reception protocol switching section that switches between communication protocols in accordance with which the receiving section receives data, based on the instruction from the control section; and
   a transmission protocol switching section that switches between communication protocols, separately from the switching of the communication protocols to be used by the receiving section, in accordance with which the transmitting section transmits data, based on the instruction from the control section,
   wherein the fieldbus controller further includes a frame checking section to check contents of a reception frame of the data received by the transmitting and receiving section, and
   the reception protocol switching section and the transmission protocol switching section each switch between the communication protocols, in accordance with which the transmitting and receiving section transmits and receives data, respectively, based on the contents of the reception frame checked by the frame checking section,
   wherein the contents of the reception frame checked by the frame checking section comprises at least one of a write command and a read command, and when the contents of the reception frame comprises the write command, the communication protocol at the reception protocol switching section comprises a safety instrumentation communication protocol, and when the contents of the reception frame comprises the read command the communication protocol at the reception protocol switching section comprises a normal protocol.

2. The field device according to claim 1, wherein the reception protocol switching section and the transmission protocol switching section respectively switch between the communication protocols for transmission data and received data independently of each other, based on the instruction from the control section.

3. The field device according to claim 1, wherein
   the control section has a register to which the fieldbus controller can refer, and
   the control section stores information on the communication protocol into the register, the communication protocol being the communication protocol on which the control section gives the instruction.

4. The fieldbus device according to claim 3, wherein the fieldbus controller determines whether the value set in the register indicates use of the normal communication protocol or the safety instrumentation protocol.

5. The field device according to claim 1, wherein when the contents of the reception frame comprises the write command, the communication protocol at the transmission protocol switching section comprises a safety instrumentation protocol, and when the contents of the reception frame comprises the write command, the communication protocol at the transmission protocol switching section comprises a normal protocol.

6. A fieldbus controller to perform protocol processing, the fieldbus controller comprising:
   a transmitting and receiving section to transmit and receive data in accordance with any of a plurality of communication protocols; and
   a transmitting section that transmits data in accordance with any of the plurality of communication protocols;
   a reception protocol switching section that switches between communication protocols in accordance with which the receiving section receives data, based on the instruction from the control section; and
   a transmission protocol switching section that switches between communication protocols, separately from the switching of the communication protocols to be used by the receiving section, in accordance with which the transmitting section transmits data, based on the instruction from the control section,
   further comprising a frame checking section to check contents of a reception frame of the data received by the transmitting and receiving section, wherein
   the reception protocol switching section and the transmission protocol switching section each switch between the communication protocols, in accordance with which the transmitting and receiving section transmits and receives data, respectively, based on the contents of the reception frame checked by the frame checking section, and
   wherein the contents of the reception frame checked by the frame checking section comprises at least one of a write command and a read command, and when the contents of the reception frame comprises the write command, the communication protocol at the reception protocol switching section comprises a safety instrumentation communication protocol, and when the contents of the reception frame comprises the read command the communication protocol at the reception protocol switching section comprises a normal protocol.

7. The fieldbus controller according to claim 6, wherein the reception protocol switching section and the transmission protocol switching section respectively switch between the communication protocols for transmission data and for received data independently of each other, based on the incoming instruction for switching.

8. The fieldbus controller according to claim 6, wherein when the contents of the reception frame comprises the read command, the communication protocol at the transmission protocol switching section comprises a safety instrumentation protocol, and when the contents of the reception frame comprises the write command the communication protocol at the transmission protocol switching section comprises a normal protocol.

9. The field controller according to claim 6, wherein the control section has a register to which the fieldbus controller can refer, and the control section stores information on the communication protocol into the register, the communication protocol being the communication protocol on which the control section gives the instruction,
   wherein the fieldbus controller determines whether the value set in the register indicates use of the normal communication protocol or the safety instrumentation protocol.

* * * * *